United States Patent
Heebner et al.

(10) Patent No.: US 10,901,295 B2
(45) Date of Patent: Jan. 26, 2021

(54) ARBITRARY PULSE SHAPING WITH PICOSECOND RESOLUTION OVER MULTIPLE-NANOSECOND RECORDS

(71) Applicant: Lawrence Livermore National Security, LLC, Livermore, CA (US)

(72) Inventors: John E Heebner, San Ramon, CA (US); Bedros Afeyan, Pleasanton, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 230 days.

(21) Appl. No.: 16/084,160

(22) PCT Filed: Mar. 10, 2017

(86) PCT No.: PCT/US2017/021887
§ 371 (c)(1),
(2) Date: Sep. 11, 2018

(87) PCT Pub. No.: WO2017/160653
PCT Pub. Date: Sep. 21, 2017

(65) Prior Publication Data
US 2020/0272024 A1 Aug. 27, 2020

Related U.S. Application Data

(60) Provisional application No. 62/307,695, filed on Mar. 14, 2016.

(51) Int. Cl.
*G02F 1/35* (2006.01)
*G02F 1/355* (2006.01)
(Continued)

(52) U.S. Cl.
CPC .......... *G02F 1/3534* (2013.01); *G02F 1/3551* (2013.01); *G02F 1/37* (2013.01);
(Continued)

(58) Field of Classification Search
CPC ........ G02F 1/3534; G02F 1/3551; G02F 1/37; G02F 1/39; G02F 2001/392;
(Continued)

(56) References Cited

U.S. PATENT DOCUMENTS 6,195,484 B1* 2/2001 Brennan, III ...... G02B 6/02138
385/37
7,796,655 B2 9/2010 Munson et al.
(Continued)

FOREIGN PATENT DOCUMENTS

WO  WO2015157778 A2  10/2015

OTHER PUBLICATIONS

Brunton et al., "The Shaping of a National Ignition Campaign Pulsed Waveform," Fusion Engineering and Design 87, 2012, pp. 1940-1944.
(Continued)

*Primary Examiner* — Daniel Petkovsek
(74) *Attorney, Agent, or Firm* — John P. Wooldridge

(57) ABSTRACT

The present invention extends the resolution capability for shaping optical pulses on laser systems from the current state of the art resolution of ~250 ps to ~1 ps by utilizing a hybrid of EOM and spectral shaping technologies. In one embodiment, a short pulse derived from a mode-locked laser oscillator is dispersed using a dispersive stretcher to about 250 ps, providing a linear mapping of spectrum to time. A typical spectral shaper is used to directly write the desired temporal pattern in the spectral domain to produce a crudely patterned waveform that may also suffer from chirp. The chirp is removed by a process known as difference frequency generation by mixing it with a pulse derived from an equally chirped frequency-doubled pump in an optical parametric amplifier. The pattern is then focused in time, which is
(Continued)

accomplished in one embodiment by propagating the pattern through a dispersive element.

52 Claims, 7 Drawing Sheets

(51) Int. Cl.
*G02F 1/37* (2006.01)
*G02F 1/39* (2006.01)
*H01S 3/00* (2006.01)
*H01S 3/11* (2006.01)

(52) U.S. Cl.
CPC .............. *G02F 1/39* (2013.01); *H01S 3/0092* (2013.01); *G02F 2001/392* (2013.01); *G02F 2201/305* (2013.01); *G02F 2203/26* (2013.01); *H01S 3/0057* (2013.01); *H01S 3/0085* (2013.01); *H01S 3/1106* (2013.01)

(58) Field of Classification Search
CPC ........... G02F 2201/305; G02F 2203/26; H01S 3/0057; H01S 3/0092; H01S 3/1106
See application file for complete search history.

(56) References Cited

U.S. PATENT DOCUMENTS

| | | | |
|---|---|---|---|
| 9,166,355 B2 | 10/2015 | Messerly et al. | |
| 2006/0050750 A1 | 3/2006 | Barty | |
| 2008/0089366 A1 | 4/2008 | Liu | |
| 2011/0026105 A1 | 2/2011 | Bayramian et al. | |
| 2012/0062876 A1 | 3/2012 | Bennett | |
| 2013/0336345 A1 | 12/2013 | Kim et al. | |
| 2014/0103018 A1* | 4/2014 | Squier .................. | B23K 26/57 219/121.61 |
| 2015/0372447 A1* | 12/2015 | Song .................... | H01S 3/0057 372/21 |

OTHER PUBLICATIONS

Burkhart et al., "Amplitude and Phase Modulation with Waveguide Optics," Proceedings of the SPIE—The International Society for Optical Engineering, SPIE, vol. 3047, 1997, pp. 610-617.
Dorrer et al., "Fiber Front End With Multiple Phase Modulations and High-Bandwidth Pulse Shaping for High-Energy Laser-Beam Smoothing." IEEE J. of Selected Topics in Quantum Elect., vol. 19, No. 6, 2013, 12 pp.
Fang et al., "Half-mJ All-Fiber-Based Single-Frequency Nanosecond Pulsed Fiber Laser at 2-mu m," IEEE Photonics Tech. Ltrs, vol. 24, No. 5, 2012, pp. 353-355.
Fontaine et al., "Demonstration of High-Fidelity Dynamic Optical Arbitrary Waveform Generation," Optics Express, vol. 18, No. 22, 2010, pp. 22988-22995.
Fontaine et al., "Demonstration of High-Fidelity Dynamic Optical Arbitrary Waveform Generation," 23rd Annual Meeting of the 2010 IEEE Photonics Society, 2010, pp. 118-119.
Fontaine et al., "Near Quantum-Limited, Single-Shot Coherent Arbitrary Optical Waveform Measurements" Optics Express, vol. 17, No. 15, 2010, pp. 12332-12344.
Gao et al. "Laser Pulse-Shaping System Based on Aperture-Coupled Striplines." Chinese Journal of Lasers, vol. 32, No. 12, 2005, pp. 1619-1622.
Heritage et al., "Picosecond Pulse Shaping by Spectral Phase and Amplitude Manipulation." Optics Letters, vol. 10, No. 12, 1985, pp. 609-611.
Huang et al., "Spectral line-by-line Shaping for Optical and Microwave Arbitrary Waveform Generations." Laser & Photon, Rev. 2, No. 4, 2008, pp. 227-248.
Hugonnot et al., "Optical Parametric Chirped-Pulse Amplifier and Spatiotemporal Shaping for a Petawatt Laser." Applied Optics, vol. 45, No. 2, 2006, pp. 377-382.
Kobayashi, "Generation of Ultrafast Laser Pulses by Electrooptic Modulation." Electronics and Communications in Japan, Part 2, vol. 75, No. 5, 1992, pp. 287-397.
Li et al., "High-energy Diode-seeded Nanosecond 2 mu m Fiber MOPA Systems Incorporating Active Pulse Shaping," Optics Letters, vol. 39, No. 6, 2014, pp. 1569-1572.
Lin et al. "Equivalent-time Electro-optic Sampling by Use of a Picosecond Laser With a Voltage-controlled Optoelectronic Pulse-delay Tuning Circuit." Applied Optics, vol. 40, No. 30, 2001, pp. 5530-5538.
Schwoerer et al., "Holography in Frequency-selective Media. III. Spectral-synthesis of Arbitrary Time-domain Pulse Shapes," J. Opt. So. Am. B, vol. 12, No. 6, 1995, pp. 1083-1093.
Scott et al., "Demonstration of Dynamic Optical Arbitrary Waveform Generation with 5-ns Record Lengths and 33-ps Features," Conference on Lasers and Electro-Optics, New York, IEEE, 2011, 2 pp.
Supradeepa et al., "Single Shot Amplitude and Phase Characterization of Optical Arbitrary Waveforms," Optics Express, vol. 17, No. 16, 2009, pp. 14434-14443.
Wang et al., "All-Fiber Arbitrary and Precise Pulse Spectral Shaping," Laser Phys. Lett., 12, 2015, 4 pp.
Wang et al. "Multibeam Optical Pulse Generation System Based on Time Division Multiplexing," Acta Physica Sinica, vol. 59, No. 12, 2010, pp. 8725-8732.
Yoshida et al., "Generation of Optional Pulse Shape by Yb Doped Fiber Laser System," Review of Laser Engineering, vol. 34, No. 11, 2006, pp. 779-782.
Zhang et al., "Arbitrary Spectral Shaping Using Optical Parametric Chirped Pulse Amplification," CLEO/PACIFIC RIM, IEEE, 2009, 2 pp.
Zhang et al., "Experimental Research on an Arbitrary Pulse Generation System for Imaging VISAR," Optics and Laser Technology, vol. 43, 2011, pp. 179-182.
Zhang et al. "Research of a High Stability Laser System for Imaging VISAR," Proceedings 2010 Symposium on Photonics and Optoelectronics (SOPO 2010), 3 pp.

* cited by examiner

ARBITRARY PULSE SHAPING WITH PICOSECOND RESOLUTION OVER MULTIPLE-NANOSECOND RECORDS

CROSS-REFERENCE TO RELATED APPLICATIONS

This application is a continuation-in-part of International Application Number PCT/US2017/021887 titled "Arbitrary Pulse Shaping with Picosecond Resolution Over Multiple-Nanosecond Records," filed Mar. 10, 2017, incorporated herein by reference, which claims the benefit of U.S. Provisional Patent Application No. 62/307,695 titled "Arbitrary Pulse Shaping with Picosecond Resolution Over Multiple-Nanosecond Records," filed Mar. 14, 2016, incorporated herein by reference.

BACKGROUND OF THE INVENTION

Field of the Invention

The present invention is directed to techniques for shaping optical pulses.

Description of Related Art

In order to control Laser-Plasma interactions (LPI), it is crucial to control the profile of a laser pulse on the time scales of instabilities such as stimulated Raman scattering, stimulated Brillouin scattering and filamenttion. Desirable pulse control capabilities for mitigating LPI include rapid oil-off switched amplitude modulation e.g., STUD pulses (spike trains of uneven duration and delay) and/or wavelength modulation. Due to the rapid time scales associated with laser plasma instabilities, this requires modulating the amplitude and/or phase (and therefore the frequency or wavelength) of a laser pulse on the time scale of picoseconds or less. Moreover, the level of control over this shaping capability should be arbitrary, dynamic and flexible. There is therefore a need to extend the resolution capability for shaping optical pulses on laser systems such the National Ignition Facility (NIF) from the current state of the art resolution of ~250 ps to ~1 ps. This improved resolution would still need to apply over a long record length of >30 nanoseconds. This represents a 250× increase in shaping resolution over the state-of-the art for long record pulse shaping methods and has never before been demonstrated. The need for such capability results from its potentially significant impacts on a) mitigating and controlling LPI and b) fundamental laser-matter interaction studies.

The current pulse shaper used on NW (Highland Technologies) provides 250 ps resolution over 34 ns of record. It is based on electro-optic modulator (EOM) technology and represented the state-of-the art 15 years in the past. Unfortunately, the technology has only evolved incrementally since then—the same company is still the leader and can now build a pulse shaper with ~100 ps resolution.

While EOMs pattern pulses directly in the time domain, the ultrafast optics community has attacked the problem from the spectral domain starting with the demonstration of the spectral shaper by Heritage and Weiner in 1984. These rely on patterning the amplitude and phase of the spectrum of a short pulse whose spectrum has been spatially dispersed by a diffraction grating, modulated with a spatial light modulator, and afterwards recombined. This consequently manipulates the pulse to take on the Fourier Transform of the spectrally written pattern. Home-built versions of this concept were constructed for projects at Lawrence Livermore National Laboratory (LLNL). Commercially, this concept can be found in the Coherent/Biophotonics Silhouette, the Finisar Waveshaper, and a closely related technology based on the acousto-optic effect as found in the Fastlite Dazzler. These methods can provide sub-ps resolution but are limited to short record lengths. They are also known to suffer from coherent interference errors resulting from indirectly writing the Fourier transform of the desired temporal pattern in the presence of hardware nonidealities which corrupt the output pattern. In related frequency-to-time conversion techniques, the record length is augmented by dispersing the spectrally patterned puke. The outputs of these systems include a highly undesirable residual chirp and associated wide bandwidth that cannot be propagated through bandwidth-limiting components such as laser gain media and harmonic converters such as on the NIF (which operates at the third harmonic wavelength of the fundamental glass laser media). No existing technology can simultaneously achieve the demanding resolution and record length requirements (high time-bandwidth product) and further do so without coherent interference errors or residual chirp.

SUMMARY OF THE INVENTION

The present invention utilizes a novel hybrid synthesis of EOM and spectral shaping technologies. It retains the coarse 250 ps shaping capability of EOM shapers and sub-modulates it using a novel architecture that solves the problems of the conventional spectral shaper. We call this invention Spectrally Transcribed And Chirp Corrected Arbitrary Temporal Optimizer or STACCATO. An embodiment of the process of the invention includes 4 steps. A short pulse derived from a mode-locked laser oscillator is dispersed using, in one embodiment, a dispersive stretcher to about 250 ps, providing a linear mapping of spectrum to time. A typical spectral shaper is used to directly write the desired temporal pattern in the spectral domain (as opposed to writing its Fourier transform in the conventional approach). This results in a crudely patterned (out of focus) waveform that may also suffer from chirp. The chirp is removed by a process known as difference frequency generation (DFG) by mixing it with a pulse derived from an equally chirped frequency-doubled pump in an optical parametric amplifier (OPA). The pattern is then focused in time, which is accomplished in one embodiment by propagating the pattern through a dispersive element such as a compressor.

These four steps can be interpreted as writing the desired temporal pattern in the spectral domain and Fourier transforming it optically to the time domain. Simple calculations show that this technique can create waveforms with less than 1 ps resolution over a 250 ps record or greater. These sub-records can then be stitched temporally to form a much longer record whose envelope can be adjusted with the coarser electro-optic modulator based pulse shaper. Most importantly, the bandwidth from the short pulse source is reduced in the chirp removal process enabling it to propagate through bandwidth-limiting elements such as laser gain media or harmonic conversion crystals.

FIG. 1 provides a general block diagram of an embodiment of the present invention. A laser source 102 (in this case a mode-locked oscillator) provides a short, coherent, transform-limited (or nearly transform-limited) seed pulse. This can be generated by any of a number of source mechanisms including but not limited to a mode-locked laser oscillator. The transform-limited pulse-width should be smaller than the finest feature desired on the final temporal waveform.

The short pulse is dispersed with an element of medium 104 that imparts either a positive or negative quadratic spectral phase. This creates a linear (or close to linear) mapping of spectrum to time (chirp) that will serve as a starting blank slate for the desired temporal waveform. This applied chirp is auxiliary to the overall process and later will be removed. The quadratic spectral phase can be applied by any of a number of dispersive elements including but not limited to diffraction grating based stretchers or compressors, dispersive optical fibers, chirped fiber Bragg gratings and chirped volume Bragg gratings.

A programmable spectral filter or spectral shaper 106 directly writes the desired temporal pattern to the spectrum of the pulse. This assumes that a calibration of spectrum to time has been performed beforehand. Because of the linear mapping of spectrum to time, this results in a patterned temporal waveform that resembles the applied spectral pattern. The patterned temporal waveform at this stage is inadequate for many applications because it suffers from two problems: a) it is chirped such that the wavelength of the pattern changes across the waveform and b) the pattern is out of focus, preventing fine features written on the spectrum to be faithfully reproduced on the temporal waveform without ringing. These two problems are addressed in the following two steps. Because these first two elements 104, 106 are linear, they may optionally be interchanged without significant impact to the system performance.

The chirp on patterned temporal waveform (signal) is removed by subtracting its temporal phase from that on an equally chirped a (pump) pulse. This can be accomplished by any of a number of nonlinear optical processes including but not limited to difference frequency generation (DFG) in an optical parametric amplifier (OPA) 108 using a material with a second-order nonlinear susceptibility. The chirp-cancelled output (idler) is kept for the next step. In order in ensure optimum synchronization and chirp cancellation, the chirped auxiliary pump pulse can be created from a copy of the short seed pulse. In this case, the pump pulse is prepared from the short seed pulse in 3 steps: a) it is first dispersed with a medium 111 that imparts twice (or nearly 2×) the quadratic spectral phase applied to the main (signal) waveform, for instance by traversing the same dispersive element a second time, b) it is amplified, for instance with a regenerative amplifier 112 to a sufficient intensity level required for the following nonlinear optical processes and c) it is frequency-doubled in a second harmonic generator 113 with another nonlinear optical process including but not limited to second harmonic generation (SHG) using a material with a second-order nonlinear susceptibility.

The chirp-cancelled output (idler) of the previous step is focused in time by a final dispersive element 110 that applies an equal and opposite quadratic spectral phase as was originally applied to the main (signal) waveform.

These steps can be interpreted as writing the desired temporal pattern in the spectral domain and Fourier transforming it optically. The bandwidth from the short pulse source is reduced in the chirp removal process. This is in contrast to traditional spectral pulse shaping methods which create waveforms in time by writing the Fourier transform of the pulse on a conventional spectral shaper as in 102 and 106 alone or assisted with a chirp as in 102, 104, and 106 alone. These do not scale well as their required spectral resolution and indirectness of the approach are the limiting factors on record length and pulse shape fidelity respectively. By contrast, in the present invention the record length can be scaled by increasing the bandwidth of the seed pulse and/or the dispersion of the stretcher(s) and compressor without residual chirp. Also by contrast in the current invention, the direct mapping if the drawn spectral shape to the output temporal waveform shape enables a closed-loop feedback process that can compensate for hardware nonidealities in a robust manner. This is because of the locality of the mapping whereby a point in spectrum directly corresponds to a point in time. This feedback ensures that it the temporal shape has of been generated as expected, it can be corrected iteratively and only sent to downstream optical components when it is both desirable and safe to do so.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

As mentioned above, the present invention has a variety of uses, which include picosecond time scale pulse shaping on laser systems used for laser-plasma or other laser-matter interactions, in laser machining, in optical telecommunications, in applications requiring coherent control and in high energy density physics (HEDP). One such laser system that would benefit from the present invention is the National Ignition Facility (NIF). To aid in understanding the invention, its use on the NIF will be discussed.

Figure 2:
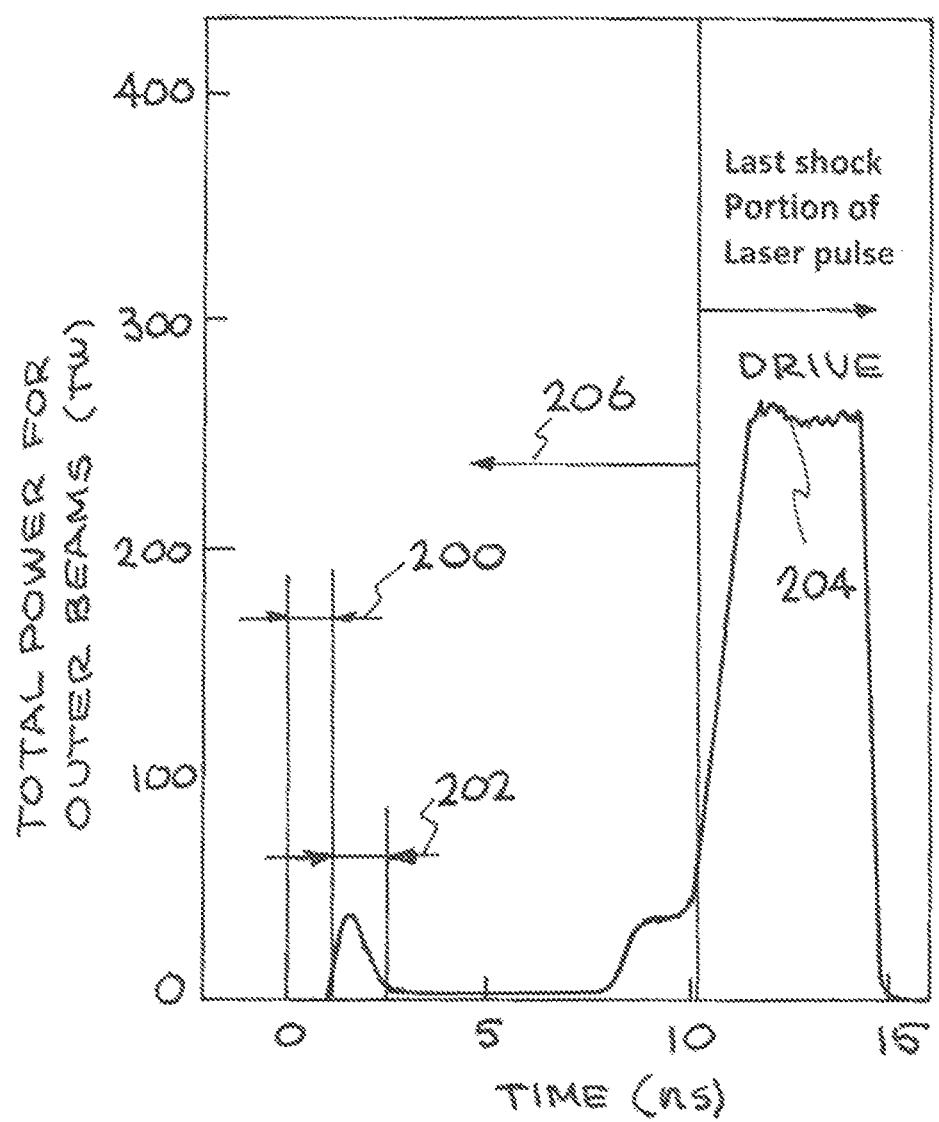
FIG. 2 shows a pulse format that is used in the National Ignition Facility.

A pulse format used in NIF is shown in FIG. 2. The figure shows the total power and pulse shape at the target for the outer NIF beams. Notice an initial burst of power occurs between about 1 ns and 2.5 ns in a section of the pulse known as the picket 202 which occurs after the section of the pulse known as the toe 200. The pulse increases again at about 8 ns and levels off until about 10 ns after which a relatively larger portion 204 of the pulse occurs from about 10 to 15 ns. Everything that occurs prior to about 10 ns is referred to collectively the foot 206. These definitions will aid in understanding the use of the present invention on the NIF.

There is concern that the pulse format of FIG. 2 is responsible for producing deleterious laser plasma interactions at the target. It has been found that the underlying, sub-modulated spike pattern 210 of FIG. 3 can be utilized to mitigate laser plasma interactions at the target. As discussed below, the present invent on is able to produce these spikes, which can then be combined with the original pulse of FIG. 2 to produce the full formatted pulse of FIG. 3. In order to achieve the laser plasma mitigation, the spikes of pulses that cross at, or otherwise interact at the target are relatively shifted in time such that the spikes of the interacting pulses are interleaved. It is desirable to have sub-structured spikes of 1 to 20 ps with duty cycles of 20% to 50%. The sub-structured pattern 210 may or may not be limited to the foot while a different modulation format for instance a conventional frequency modulation (FM) may or may not be limited to the drive portion of the pulse 204. Here, the numbers (1×, 2×, 5×) refer to the ratio of the peak power of the composite pulse (which includes the underlying sub-modulated pattern of spikes) to the peak power of the coarse envelope as in FIG. 2. The values are inversely related to the local duty cycle or fill-fraction of the sub-modulated pattern. By the time the value is 1×, note that the pulse duration with 50% duty cycle spikes must then be increased so as to include the same energy with the same peak intensity (which requires a twice as long pulse).

Figure 4:
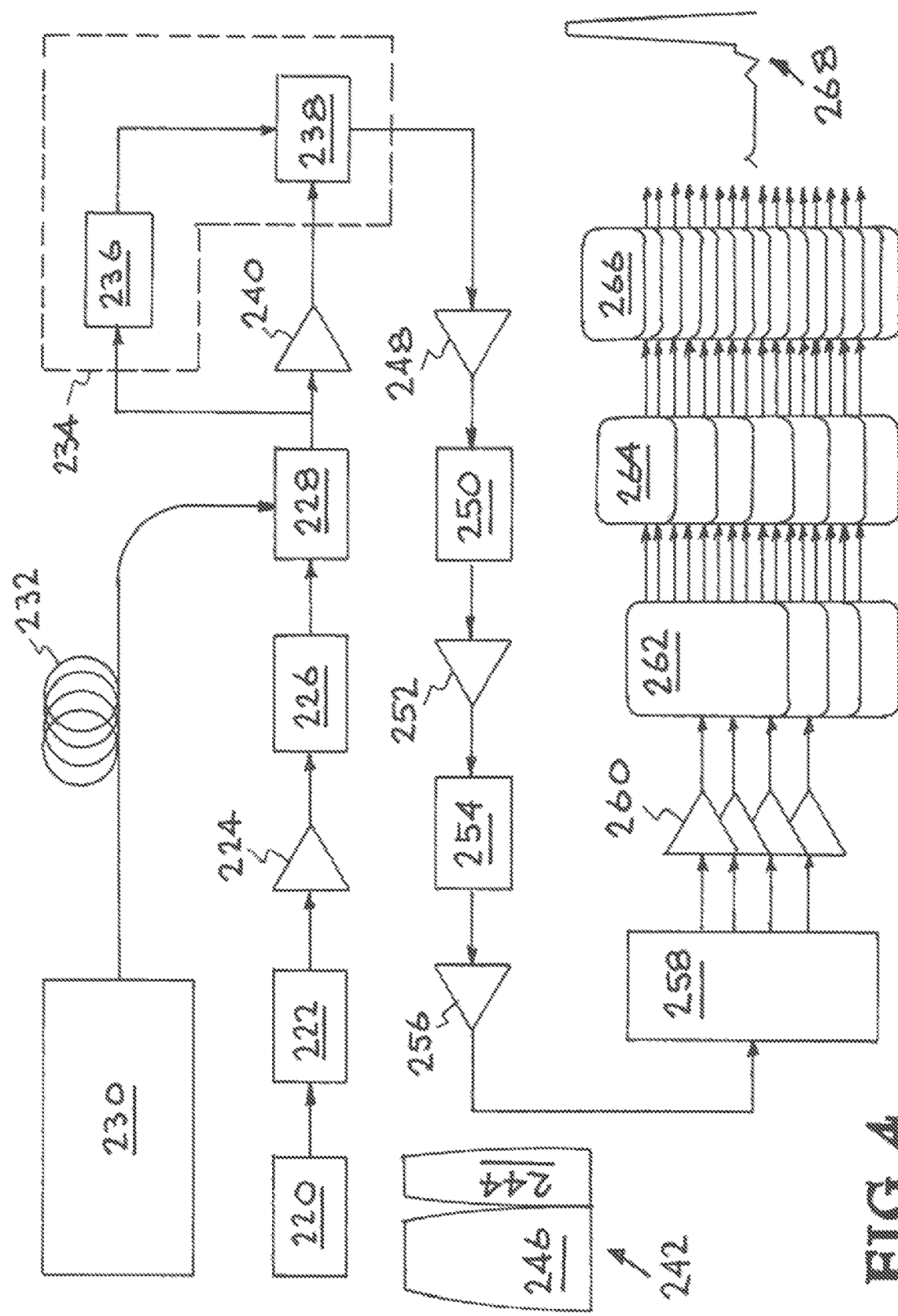
FIG. 4 illustrates a way to combine the spike pattern FIG. 3 with the pulse format of FIG. 2.

FIG. 4 illustrates a way to combine the spike pattern 210 with the pulse of FIG. 2. The technique for producing the spike pattern is discussed in the Summary of the Invention and will be discussed in more detail below. In FIG. 4, the pulse format of FIG. 2 is produced by directing a pulse from oscillator 220 through an acousto-optic modulator 222, amplifier 224, frequency modulator (FM) 226 and into a temporal splicer 228. The spike pattern can be overlaid onto the foot and/or drive of the pulse format of FIG. 2 by producing the spike pattern with an embodiment of the invention, shown as element 230 and directing that pattern through fiber 232 into temporal splicer 228. A portion of the output beam from the temporal splicer is directed into a failsafe system 234 which includes a Failsafe diagnostic 236 and a failsafe gate 238. The remaining portion of the output beam from the temporal splicer is a directed through an amplifier 240 and through the Failsafe gate to produce a combined pulse 242 consisting of an FM portion 244 and a structured portion 246 (which includes the spike pattern). The output pulse from the Failsafe gate is then directed through a final series of elements to produce a plurality of shaped 2-format pulses. This final series of elements includes an amplifier 248, a dispersion compensator 250, an amplifier 252, a 1×2 splitter 254, an amplifier 256, a 1×4 splitter 258, four amplifiers 260 (one for each of the split beams), another 1×4 splitter 262, individual delays 264 for each beam and an individual EOM based pulse shaper 266 for each beam to produce a plurality of shaped 2-format pulses 268. Note that in this system, the output beam from FM 226 can be directed through the system with, or without the patterned pulses, and vice versa. Spikes are implicitly on the foot portions of combined pulses 246 and 268 but are too fine to display.

Figure 1:
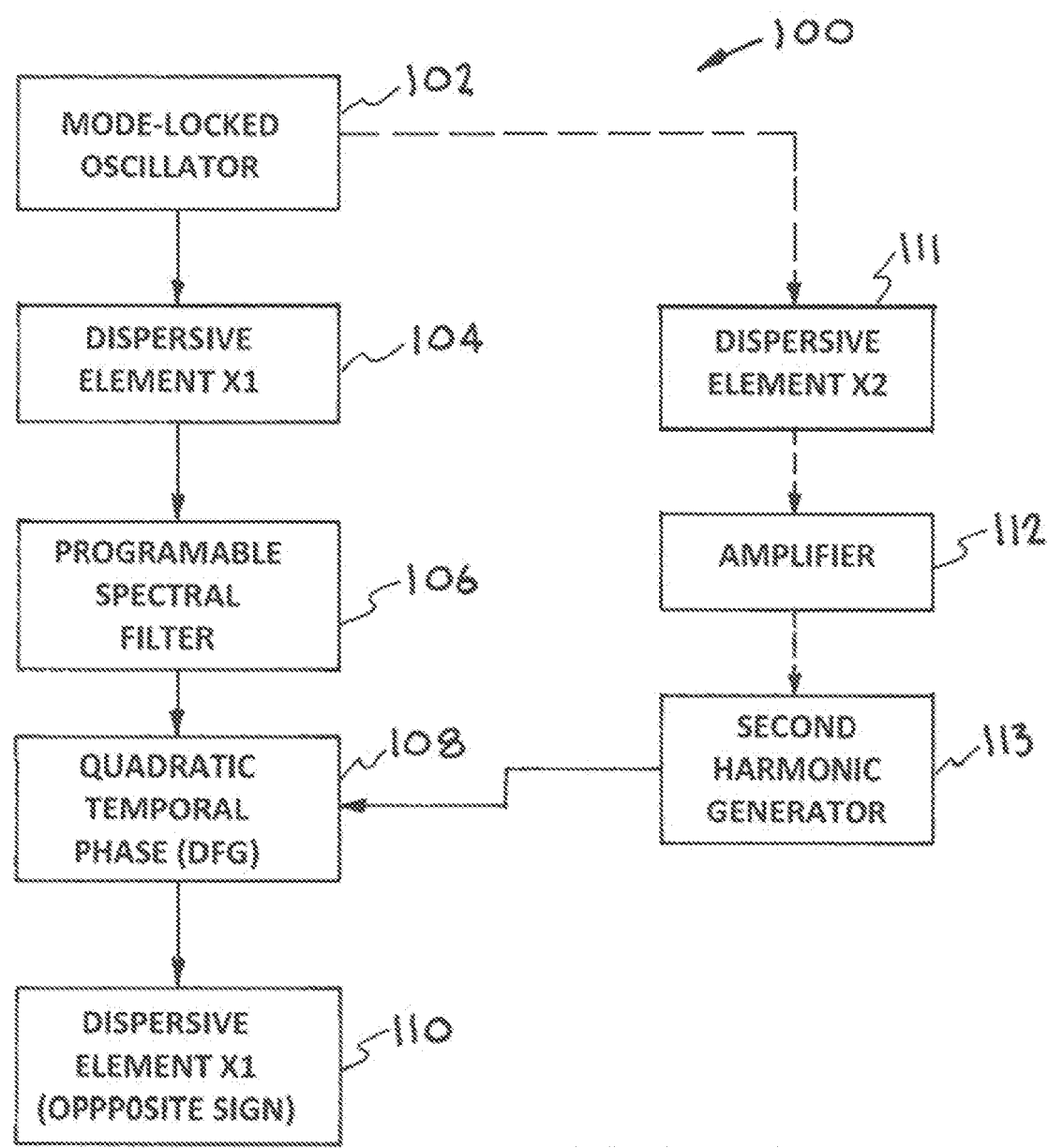
FIG. 1 provides a general block diagram of an embodiment of the present invention.
Figure 3:
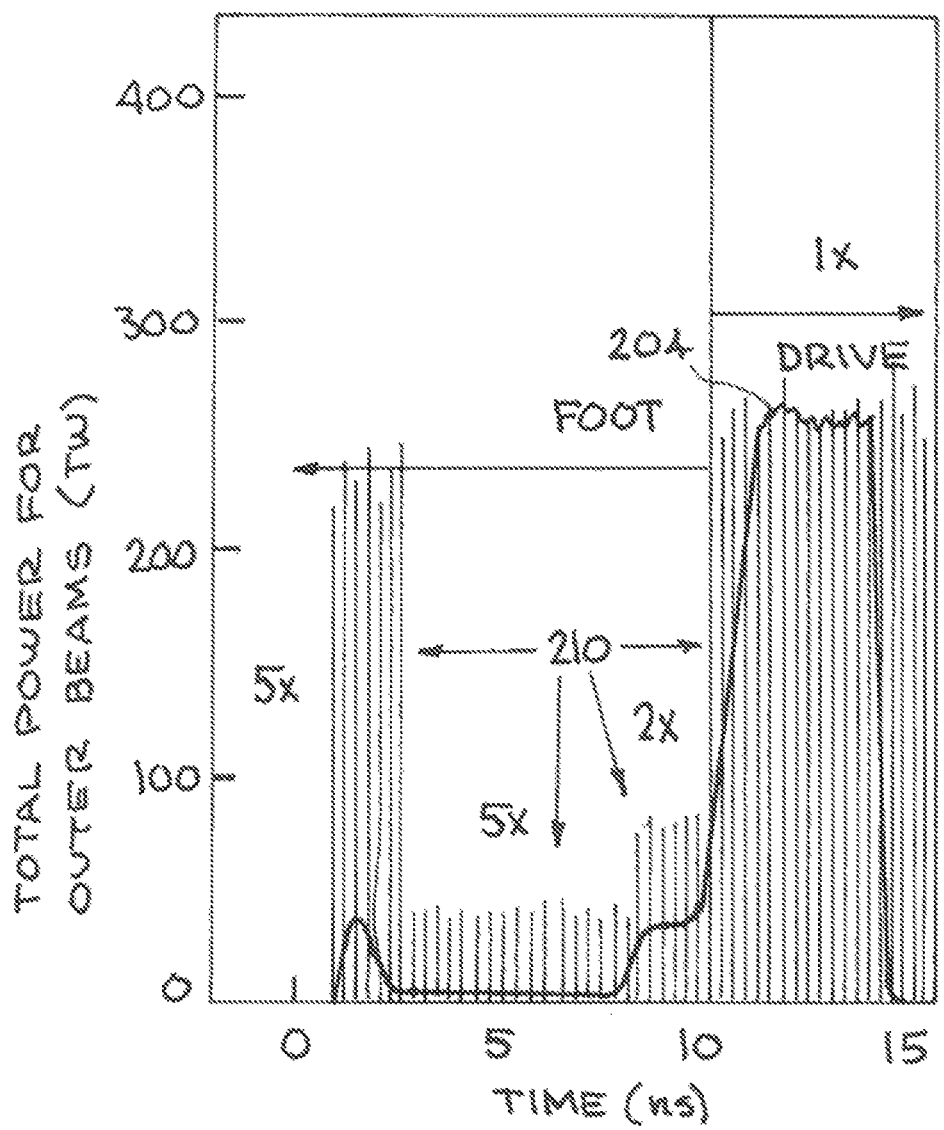
FIG. 3 shows a pulse format that is used in the National Ignition Facility with an underlying, sub-modulated spike pattern produced by the present invention.

Thus, it is desirable to provide a way to produce a pulse format as shown in FIG. 3 and to inject it into the system architecture of NIF as in FIG. 4. The present invention, as generally described above in the embodiment of FIG. 1 of the Summary, is more specifically described below in the embodiment of FIG. 5.

Figure 5:
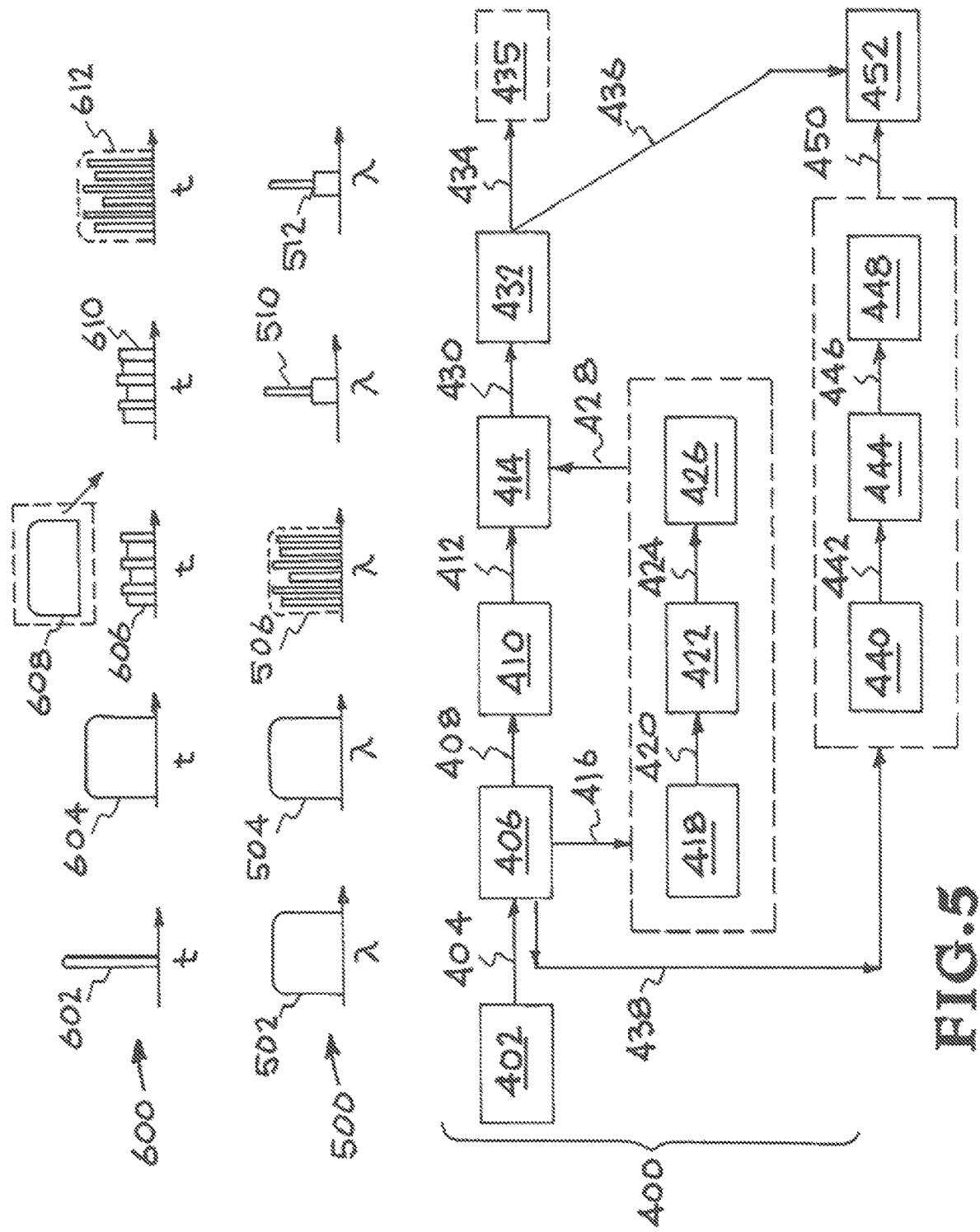
FIG. 5 illustrates an embodiment of the invention.

FIG. 5 illustrates an embodiment of the invention. The figure shows a system diagram 400, a row 500 showing the spectral domain of the short pulse which originated from a laser source (in this case a mode-locked oscillator) providing a short, coherent, transform-limited (or nearly transform-limited) seed pulse 402. The figure also shows a row 600 illustrating the time domain of the short pulse and the pattern into which it evolves at the same points in the invention as shown in the spectral domain of row 500. To avoid confusion, the system diagram will be described first, followed by a description of the spectral domain and the time domain.

The basic elements of the system and the beams of the system are now described. Note that those skilled in the art, based on the present disclosure, will understand that alternate elements and configurations may be substituted for those now described. A laser source (in this case a mode-locked oscillator) providing a short, coherent, transform-limited (or nearly transform-limited) seed pulse 402 produces an output beam 404 which is directed into stretcher 406 that produces an output beam 408. The output beam 408 is input into spectral shaper 410 which provides an output beam 412 that is directed into the optical parametric oscillator (OPA) 414. The output beam 408 is divided to produce a second beam 416 that is passed through a second stretcher 418 or alternatively the same stretcher 406 for a second pass to produce a second stretched beam 420 that is amplified in this case in a regenerative amplifier 422 to produce output beam 424 that is input into the non-linear crystal of the second harmonic generator 426. The output beam 428 from second harmonic generator 426 is injected into the non-linear crystal of the OPA 414. The idler output created by difference frequency generation (DFG) produces beam 430 from OPA 414 is then injected into a compressor 432 that provides dispersion of equal or nearly equal value and opposite sign of the stretcher in 406. The output of compressor 432 is split into two beams 434 and 436. Beam 434 is the patterned output of the system that may be directed for further shaping and/or stitching for instance serving as the output of 230, and beam 436 is directed to a cross-correlator 452 for verification and closed-loop feedback control with spectral shaper 410 or other controllable subcomponents. The output beam 408 is also divided to produce beam 438 that is amplified in this case in a regenerative amplifier 440 for producing beam 442 that is directed in compressor 444. The compressor provides dispersion of equal value and opposite sign of the stretcher in 406. Compressor 444 produces a short pulse beam 446 that is either used directly in cross-correlator 452 or alternatively first input into SHG 448. The output beam 450 is also directed into cross-correlator 452 where the output pattern in beam 436 (and hence, beam 434) is verified. Verification occurs by measuring (sampling) the pulse pattern 436 with the short pulse 450 in the non-linear element of the cross-correlator. The sampling can occur, for instance 1$w$ sum frequency generation (SFG) in either a scanning or in a single-shot geometry. The verification may be of the time-dependent amplitude and/or the time-dependent phase of the pattern. The phase may be measured in the cross-correlator by first interferometrically mixing the pulse pattern with a reference beam that contains a flat or calibrated temporal phase profile as in temporal interferometry. Alternatively, it may be simply screened as being distorted from the ideal pattern by first passing it through an element that converts phase to amplitude such as an etalon or other self-referencing interferometer. Alternatively, it may be inferred by passing the output of the cross-correlator through a spectrometer as in Frequency Resolved Optical Gating (FROG). Alternatively, it may be inferred by Spectral Shearing Interferometry (SSI) or Spectral Phase Interferometry for Direct Electric Field Reconstruction (SPIDER) methods. Any error between the desired temporal pattern and the measured temporal pattern can be corrected through closed-loop feedback control with spectral shaper 410, compressor 444 or other controllable subcomponents. This brings the ability to further pre-compensate for amplitude and phase distortions expected in the downstream components of a larger optical system. This also brings the ability to screen for potentially unsafe temporal patter such as ensuring that the peak amplitude remains below a defined threshold) for downstream laser/optical damage e.g., +10% of the desired pattern or that the phase distortions are kept below a defined threshold e.g., 3 radians. Additionally, beam 434 may be passed through optional optical component 435 which may consist, e.g., of a diffractive optical component such as a diffraction grating that converts modulation of the wavelength into modulation of the angle, pointing, steering, or deflection. Alternatively, optional optical component 435 may consist of a birefringent optical component such as a wave plate or wave retarder. In this case, beam 434 may be passed through optical component 435, which converts modulation of the wavelength into modulation of the polarization state of the light. This may include the orientation of the electric field vector or the relative phase between the two polarization states. Thus, the elements and flow of system diagram 400 have been described.

The characteristics of the spectral domain and time domain change as the pulse propagates through the system. In the time domain, pulse 404 is considered to be a short pulse, which means that it has a short time duration. In this embodiment, the duration 602 of pulse 404 is much less than one picosecond. The spectral content 502 of wavelengths within pulse 404 consists of a continuous spectrum from short wavelength to longer wavelength, all within pulse 602. This is the condition in which the pulse is referred to as being transform limited (or near transform limited). This pulse is directed into stretcher 406 which produces output pulse 408. The stretcher disperses pulse 408 such that its duration is increased as in 604 and the spectral amplitude content 504 of wavelengths remains unchanged or nearly unchanged. In 604, the pulse is chirped whereby the short wavelengths begin on the early (left) side of the pulse pattern and continuously change to longer wavelengths from early to late times (left to right) on the page. The orientation of this spectrum depends on whether the stretcher 406 is configured to impart either a positive or negative quadratic spectral phase.

Output pulse 408 is directed into spectral shaper 410 which produces output pulse 412 that has a shaped spectrum 506 which is depicted in the time domain at 606, however as discussed above, the pulse in the time domain at 606 remains undesirably chirped and is not focused. These drawbacks are corrected in the following two steps. The output pulse 412 is input into OPA 414 as is the output pulse 428 from second harmonic generator 426. The time domain of output pulse 428 is depicted at 608. In the OPA process, beam 412 and 428 are considered to be the signal beam and the pump beam respectively. The OPA outputs three beams, which are the signal beam, the pump beam and a newly generated idler beam. In the present invention, it is the idler beam 430 which is used in the subsequent step, which is the step of focusing the pulse pattern. Notice that the output beam 430 now has a spectral shape 510 that is well defined and centered at a single wavelength (or having a relatively small bandwidth of wavelengths compared to the bandwidth of beam 404, which is shown at 502. Again however, in the time domain, the pulse pattern is still unfocused as shown at 610. The output beams 434 and 436 have the same spectral content 512 as that at 510 but the result of compression is to produce a focused pattern 612. The pulse pattern in the time domain is now a scaled replica of the pattern applied in the spectral domain at 412 depicted in 506. This enables a direct shaping of the time domain by the controllable elements in the spectral shaper 410. Additionally, because spectral shaper 410 may modify either the amplitude or the phase of the spectral domain 506 of the temporal pulse 606, either the amplitude or the phase of the final temporal pattern may be modified at 434 and 436. The phase of the temporal pattern is related to the frequency or wavelength and hence this provides a means of dynamically modifying the frequency or wavelength of the final temporal pattern at 434 and 436.

Figure 6:
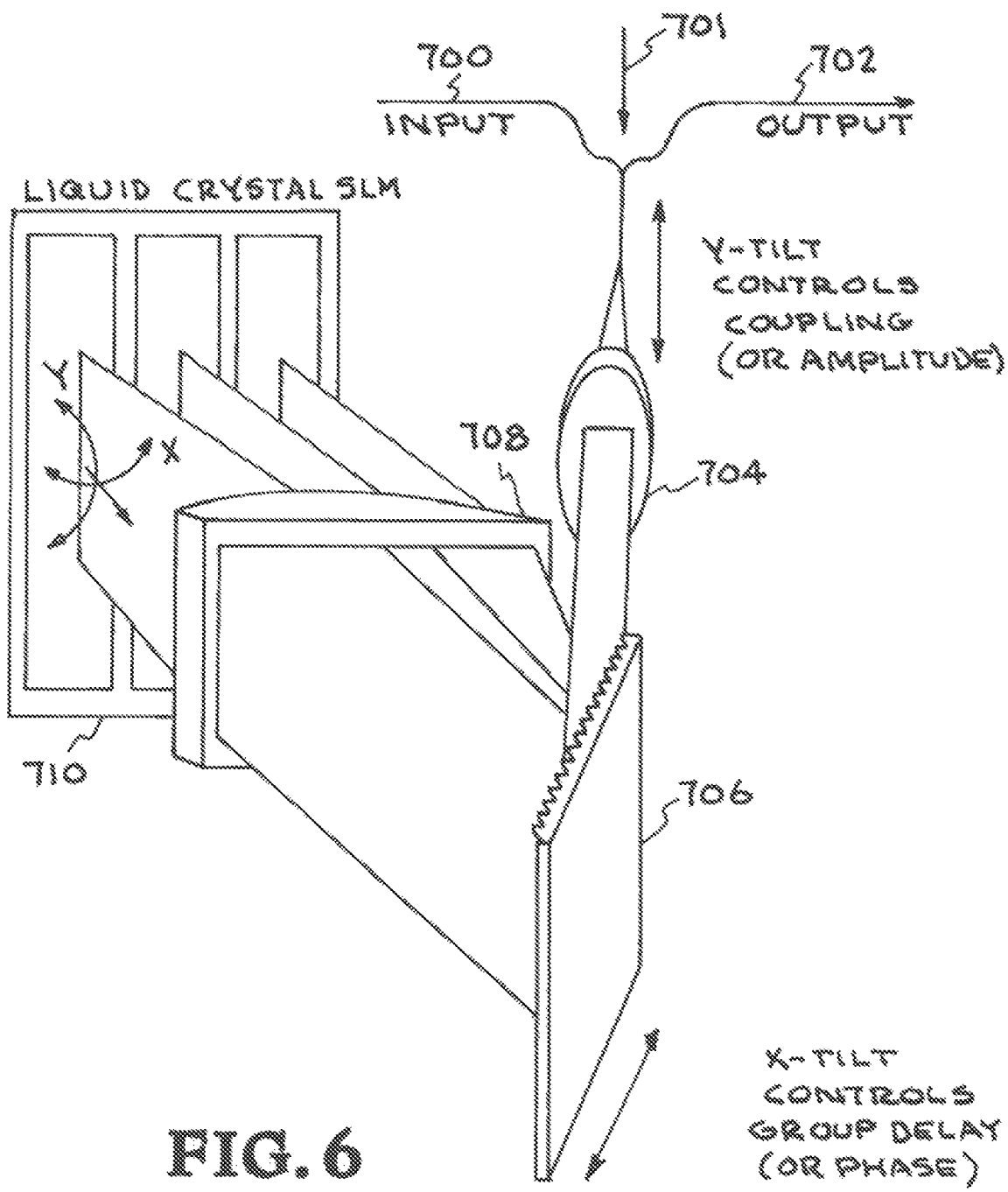
FIG. 6 illustrates an exemplar spectral shaper used in an embodiment of the present invention.

As mentioned, the programmable spectral filter or spectral shaper 106 directly writes the desired temporal pattern to the amplitude and/or phase of the spectrum of the pulse. An example spectral shaper used in an embodiment of the present invention is shown in FIG. 6. In this example, a pulse is directed through the input port 700 of fiber splitter 701. The pulse is directed through a coupling lens 704 and the spectral content of the pulse is dispersed angularly with a diffraction grating 706 and focused by a lens 708 onto a spatial light modulator 710 (or spatially programmable mask). The spatial light modulator may alter the amplitude and/or phase of each spectral component. The spectral components are then recombined as the system is retraced backward and out of the output port 702 of the fiber splitter. Alternately, an acousto-optic spectral shaper such as the Dazzler may be used as the spectral shaper. Other spectral shapers now known or developed in the future, that ma be substituted for the spectral shaper (e.g., element 410) of the present invention, are within the scope of the present invention.

Figure 7:
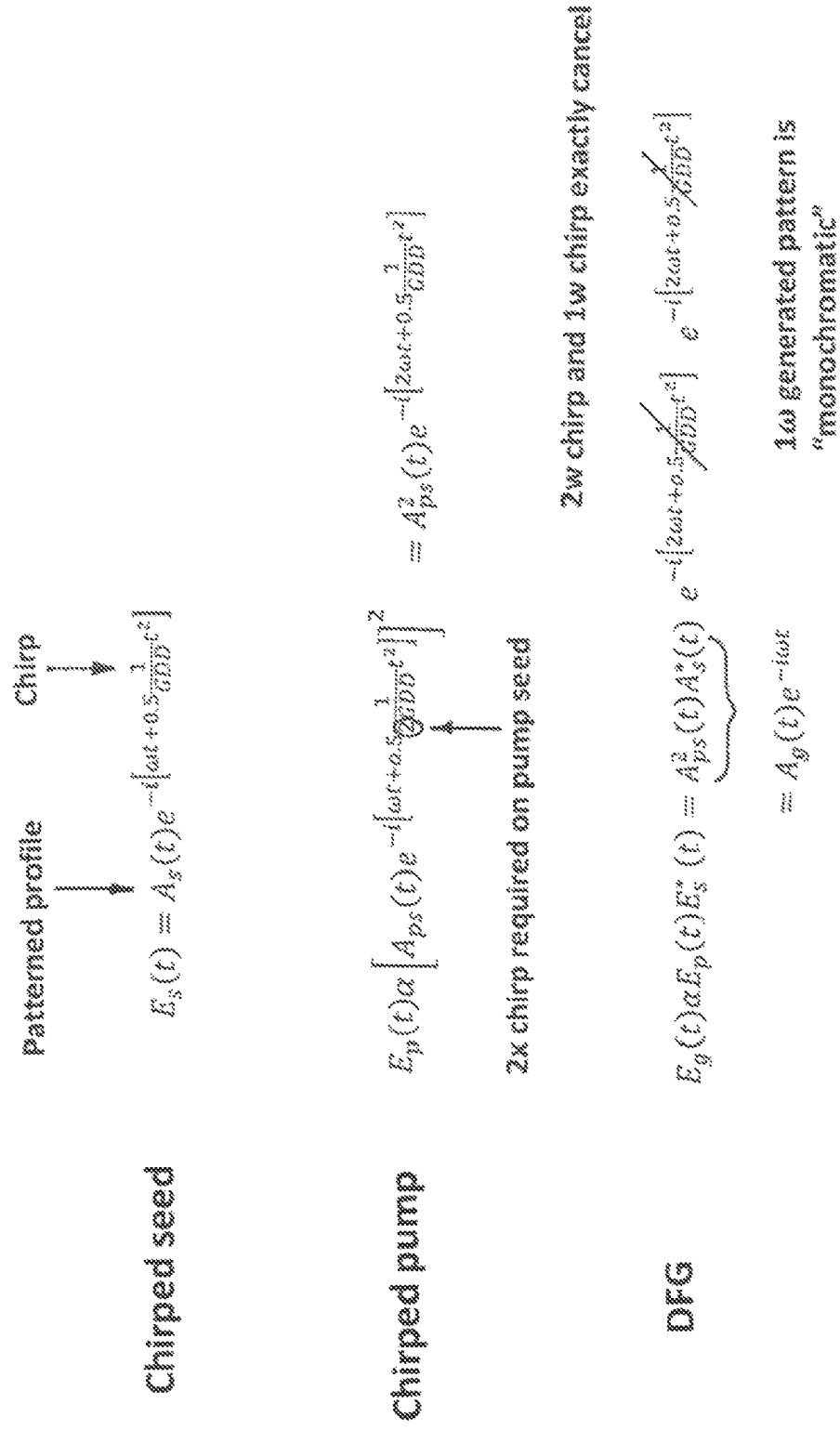
FIG. 7 provides formulas that define how the chirped pump and chirped signal are mixed to create the chirp-cancelled monochromatic idler through the difference frequency generation (DFG) process.

FIG. 7 defines how the chirped pump and chirped signal are mixed to create the chirp-cancelled monochromatic idler through the difference frequency generation (DFG) process. Crucially the quadratic phase terms associated with the chirp are cancelled if the group delay dispersion (GDD) of the pump (prior to second harmonic generation) is twice that of the signal. The chirped seed or signal $E_s(t)$ consists of a patterned profile $A_s(t)$ at frequency omega and with a quadratic temporal phase (chirp) parameterized by group delay dispersion GDD. The chirped pump $E_p(t)$ consists initially of ideally flat in time profile. $A_{ps}(t)$ at frequency omega and with a quadratic temporal phase (chirp) parameterized by group delay dispersion 2 GDD. This electric field is squared by the hart c doubling process resulting in an ideally flat in time profile $A_{ps}^2(t)$ at the doubled frequency 2 omega and with a quadratic temporal phase (chirp) parameterized by group delay dispersion GDD. The generated idler output $E_g(t)$ results with a patterned profile $A_g(t)$ equaling $A_{ps}^2(t) A_s^*(t)$ and thus proportional to the (complex-conjugate) of the desired temporal pattern at frequency omega and with no quadratic temporal phase (chirp) since it has been cancelled in the Difference Frequency Generation (DFG) process.

Note that the invention can not only pattern the amplitude but also be phase (or wavelength or frequency) as well. Just as if the spectral shaper writes an amplitude pattern in the spectral domain it will show up as a scaled amplitude in the temporal domain, if the spectral shaper writes a phase shift pattern in the spectral domain it will show up as a scaled phase shift pattern in the temporal domain. Due to the difference generation process, it is the complex-conjugate of the signal field that is imprinted on the idler field and hence the resulting phase shift pattern of the idler output is inverted or the negative of the phase shift patterned signal. The time derivative of the phase shift pattern in the time domain is equivalently the local frequency shift and the frequency shift is related to the wavelength shift.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated.

We claim:

1. An apparatus, comprising:
   a source for providing a coherent short duration laser pulse;
   a stretcher to disperse the time domain of said pulse to produce a chirped pulse;
   means for applying a desired temporal pattern in the spectral domain of said chirped pulse to produce an unfocused shaped pulse;
   means for removing the chirp from said unfocused shaped pulse to produce an unchirped shaped pulse; and
   means for focusing in the time domain said unchirped shaped pulse to produce a focused shaped pulse.

2. The apparatus of claim 1, wherein said short duration laser pulse is transform limited.

3. The apparatus of claim 1, wherein said short duration laser pulse is near transform limited.

4. The apparatus of claim 1, wherein the pulse-width of said laser pulse is smaller than the finest feature desired on the temporal waveform of said focused shaped pulse.

5. The apparatus of claim 1, wherein the duration of said laser pulse is less than one picosecond.

6. The apparatus of claim 1, wherein the duration of said laser pulse is less than one picosecond.

7. The apparatus of claim 1, wherein said stretcher disperses the time domain of said pulse to about 250 ps, providing a linear mapping of spectrum to time.

8. The apparatus of claim 1, wherein said stretcher disperses the time domain of said pulse to provide a linear mapping of spectrum to time.

9. The apparatus of claim 1, wherein said stretcher imparts to said laser pulse either a positive quadratic spectral phase or a negative quadratic spectral phase.

10. The apparatus of claim 1, wherein said stretcher comprises a dispersive element selected from the group consisting of at least one diffraction grating, at least one dispersive optical fiber, at least one chirped fiber Bragg grating and at least one chirped volume Bragg grating.

11. The apparatus of claim 1, wherein said means for applying a desired temporal pattern is selected from the group consisting of a spectral shaper and a programmable spectral filter.

12. The apparatus of claim 1, wherein said means for removing said chirp from said unfocused shaped pulse comprises an apparatus configured to carry out a nonlinear optical process.

13. The apparatus of claim 12, wherein said nonlinear optical process comprises difference frequency generation (DFG) in an optical parametric amplifier (OPA).

14. The apparatus of claim 13, wherein said OPA comprises a nonlinear crystal (NLC), wherein said unfocused shaped pulse is directed onto said NLC and serves as a signal beam, wherein said apparatus further comprises means for producing from said laser pulse, a pump beam for pumping said NLC, wherein said pump beam comprises a doubly-stretched and frequency-doubled version of said laser pulse, wherein said NLC produces an idler beam which serves as said unchirped shaped pulse.

15. The apparatus of claim 14, wherein said means for producing from said laser pulse, a pump beam for pumping said NLC comprises (i) means for twice stretching said laser pulse to produce a twice stretched pulse, (ii) an amplifier to amplify said twice stretched pulse to produce an amplified pulse and (iii) means for doubling the frequency of said amplified pulse to produce said pump beam.

16. The apparatus of claim 15, wherein said means for doubling the frequency of said amplified pulse comprises an apparatus configured to carry out a second nonlinear optical process.

17. The apparatus of claim 16, wherein said second nonlinear optical process comprises second harmonic generation (SHG) using a material with a second-order nonlinear susceptibility.

18. The apparatus of claim 1, wherein said means for focusing in the time domain said unfocused shaped pulse comprises a dispersive element that applies an equal and opposite quadratic spectral phase to said unchirped shaped pulse as was applied to said chirped pulse.

19. The apparatus of claim 1, wherein said temporal pattern comprises a pattern selected from the group consisting of amplitude, phase, wavelength and frequency.

20. The apparatus of claim 19, further comprising a closed-loop feedback control system for correcting error in either the amplitude or phase between a measured temporal pattern in said focused shaped pulse and a desired temporal pattern.

21. The apparatus of claim 19, wherein said means for removing said chirp from said unfocused shaped pulse comprises an apparatus configured to carry out a nonlinear optical process, wherein said nonlinear optical process comprises difference frequency generation (DFG) in an optical parametric amplifier (OPA) wherein said OPA comprises a nonlinear crystal (NLC), wherein said unfocused shaped pulse is directed onto said NLC and serves as a signal input beam, wherein said apparatus further comprises means for producing from said laser pulse, a pump input beam for pumping said NLC, wherein said pump beam comprises a doubly-stretched and frequency-doubled version of said laser pulse, wherein said NLC produces an idler beam which serves as said unchirped shaped pulse, wherein said NLC further produces a pump output beams from said pump input beam, wherein said NLC further produces a signal output beams from said signal input beam, further comprising a closed-loop feedback control system for correcting error in said idler beam by measuring properties of said pump output beam and signal output beam by measuring the amplitude and/or phase of said pump output beam and said signal output beams.

22. The apparatus of claim 1, wherein said apparatus is configured to provide more than one focused shaped pulse to produce a series of focused shaped pulses, said apparatus further comprising a fast optical switch configured to stitch together said series of focused shaped pulses to form a record that is longer than a single said focused shaped pulse.

23. The apparatus of claim 22, further comprising an electro-optic modulator configured to provide a coarse pulse envelope, the apparatus further comprising means for combining said focused shaped pulse with said coarse pulse envelope.

24. The apparatus of claim 1, further comprising a diffractive optical component configured to convert modulation of the wavelength of said focused shaped pulse into modulation of the direction of said focused shaped pulse.

25. The apparatus of claim 1, further comprising means for converting modulation of the wavelength of said focused shaped pulse into modulation, of the polarization state of said focused shaped pulse.

26. The apparatus of claim 25, wherein said modulation of the polarization state of said focused shaped pulse is selected from the group consisting of the orientation of the electric field vector of said focused shaped pulse and the relative phase between the two polarization states of said focused shaped pulse.

27. A method, comprising:
providing a coherent short duration laser pulse;
dispersing the time domain of said pulse to produce a chirped pulse;
applying a desired temporal pattern in the spectral domain of said chirped pulse to produce an unfocused shaped pulse;
removing the chirp from said unfocused shaped pulse to produce an unchirped shaped pulse; and
focusing in the time domain said unchirped shaped pulse to produce a focused shaped, pulse.

28. The method of claim 27, wherein said short duration laser pulse is transform limited.

29. The method of claim 27, wherein said short duration laser pulse is near transform limited.

30. The method of claim 27, wherein the pulse-width of said laser pulse is smaller than the finest feature desired on the temporal waveform of said focused shaped pulse.

31. The method of claim 27, wherein the duration of said laser pulse is less than one picosecond.

32. The method of claim 27, wherein the duration of said laser pulse is less than one picosecond.

33. The method of claim 27, wherein the step of dispersing is carried out with a stretcher, wherein said stretcher disperses the time domain of said pulse to about 250 ps, providing a linear mapping of spectrum to time.

34. The method of claim 27, wherein the step of dispersing is carried out with a stretcher, wherein said stretcher disperses the time domain of said pulse to provide a linear mapping of spectrum to time.

35. The method of claim 27, wherein the step of dispersing is carried out with a stretcher, wherein said stretcher imparts to said laser pulse either a positive quadratic spectral phase or a negative quadratic spectral phase.

36. The method of claim 27, wherein the step of dispersing is carried out with a stretcher, wherein said stretcher comprises a dispersive element selected from the group consisting of at least one diffraction grating, at least one dispersive optical fiber, at least one chirped fiber Bragg grating and at least one chirped volume Bragg grating.

37. The method of claim 27, wherein the step of applying a desired temporal pattern is carried out with an element selected from the group consisting of a spectral shaper and a programmable spectral filter.

38. The method of claim 27, wherein the step of removing said chirp from said unfocused shaped pulse is carried out with a nonlinear optical process.

39. The method of claim 38, wherein said nonlinear optical process comprises difference frequency generation (DFG) in an optical parametric amplifier (OPA).

40. The method of claim 39, wherein said OPA comprises a nonlinear crystal (NLC), wherein said unfocused shaped pulse is directed onto said NLC and serves as a signal beam, wherein said method further comprises producing from said laser pulse, a pump beam for pumping said NLC, wherein said pump beam comprises a doubly-stretched and frequency-doubled version of said laser pulse, wherein said NLC produces an idler beam which serves as said unchirped shaped pulse.

41. The method of claim 40, wherein the step of producing from said laser pulse, a pump beam for pumping said NLC comprises (i) twice stretching said laser pulse to produce a twice stretched pulse, (ii) amplifying said twice stretched pulse to produce an amplified pulse and (iii) doubling the frequency of said amplified pulse to produce said pump beam.

42. The method of claim 41, wherein the step of doubling the frequency of said amplified pulse is carried out with a second nonlinear optical process.

43. The method of claim 42, wherein said second nonlinear optical process comprises second harmonic generation (SHG) using a material with a second-order nonlinear susceptibility.

44. The method of claim 27, wherein the step of focusing in the time domain said unfocused shaped pulse is carried out with a dispersive element that applies an equal and opposite quadratic spectral phase to said unchirped shaped pulse as was applied to said chirped pulse.

45. The method of claim 27, wherein said temporal pattern comprises a pattern selected from the group consisting of amplitude, phase, wavelength and frequency.

46. The method of claim 27, further comprising a closed-loop feedback control system for correcting error between a measured temporal pattern in said focused shaped pulse and a desired temporal pattern.

47. The method of claim 45, wherein the step of removing said chirp from said unfocused shaped pulse is carried out with a nonlinear optical process, wherein said nonlinear optical process comprises difference frequency generation (DFG) in an optical parametric amplifier (OPA), wherein said OPA comprises a nonlinear crystal (NLC), wherein said unfocused shaped pulse is directed onto said NLC and serves as a signal input beam, wherein said method further comprises producing from said laser pulse, a pump input beam for pumping said NLC, wherein said pump beam comprises a doubly-stretched and frequency-doubled version of said laser pulse, wherein said NLC produces an idler beam which serves as said unchirped shaped pulse, wherein said NLC further produces a pump output beam from said pump input beam, wherein said NLC further produces a signal output beam from said signal input beam, the method further comprising using a closed-loop feedback control system for correcting error in said idler beam by measuring properties of said pump output beam and signal output beam by measuring the amplitude and/or phase of said pump output beam and said signal output beam.

48. The method of claim 27, further comprising providing more than one focused shaped pulse to produce a series of focused shaped pulses, further comprising using a fast optical switch to stitch together said series of focused shaped pulses to form a record that is longer than a single said focused shaped pulse.

49. The method of claim 48, further comprising using an electro-optic modulator to provide a coarse pulse envelope and combining said focused shaped pulse with said coarse pulse envelope.

50. The method of claim 27, further comprising using a diffractive optical component to convert modulation of the wavelength of said focused shaped pulse into modulation of the direction of said focused shaped pulse.

51. The method of claim 27, further comprising converting modulation of the wavelength of said focused shaped pulse into modulation of the polarization state of said focused shaped pulse.

52. The method of claim 51, wherein said modulation of the polarization state of said focused shaped pulse is selected from the group consisting of the orientation of the electric field vector of said focused shaped pulse and the relative phase between the two polarization states of said focused shaped pulse.

* * * * *